(12) United States Patent
Yamaguchi

(10) Patent No.: US 7,941,678 B2
(45) Date of Patent: May 10, 2011

(54) IMAGE PROCESSING APPARATUS

(75) Inventor: Tatsumi Yamaguchi, Tokyo (JP)

(73) Assignee: Oki Data Corporation, Tokyo (JP)

( * ) Notice: Subject to any disclaimer, the term of this patent is extended or adjusted under 35 U.S.C. 154(b) by 1095 days.

(21) Appl. No.: 11/706,280

(22) Filed: Feb. 15, 2007

(65) Prior Publication Data

US 2007/0214290 A1    Sep. 13, 2007

(30) Foreign Application Priority Data

Mar. 10, 2006  (JP) ................................ 2006-066571

(51) Int. Cl.
*G06F 1/00* (2006.01)
(52) U.S. Cl. .................... 713/300; 713/340; 711/100
(58) Field of Classification Search .................. 713/300, 713/340; 714/47, 100; 711/100
See application file for complete search history.

(56) References Cited

U.S. PATENT DOCUMENTS

| | | | | |
|---|---|---|---|---|
| 5,620,264 | A * | 4/1997 | Kagita | 400/74 |
| 6,486,419 | B2 * | 11/2002 | Horiguchi et al. | 200/43.19 |
| 6,910,817 | B2 * | 6/2005 | Fukano | 400/76 |
| 7,024,674 | B2 * | 4/2006 | Shepherd et al. | 720/692 |
| 7,512,838 | B2 * | 3/2009 | Rector et al. | 714/14 |
| 7,533,378 | B2 * | 5/2009 | Maeda et al. | 717/168 |
| 7,542,091 | B2 * | 6/2009 | Bean et al. | 348/372 |
| 7,653,841 | B2 * | 1/2010 | Yokokura | 714/48 |
| 7,654,466 | B2 * | 2/2010 | Maeda et al. | 235/492 |
| 2003/0107346 | A1 * | 6/2003 | Bean et al. | 320/136 |
| 2003/0107971 | A1 * | 6/2003 | Shepherd et al. | 369/75.1 |
| 2003/0155220 | A1 * | 8/2003 | Cho | 200/43.01 |
| 2004/0078666 | A1 * | 4/2004 | Aasheim et al. | 714/24 |
| 2004/0111582 | A1 * | 6/2004 | Maeda et al. | 711/202 |
| 2005/0088688 | A1 * | 4/2005 | Noda | 358/1.15 |
| 2005/0128319 | A1 * | 6/2005 | Morino | 348/231.7 |
| 2005/0128512 | A1 * | 6/2005 | Kurotsu | 358/1.15 |
| 2005/0134704 | A1 * | 6/2005 | Uryu et al. | 348/231.7 |
| 2005/0172294 | A1 * | 8/2005 | Kanemura et al. | 718/107 |
| 2006/0004947 | A1 * | 1/2006 | Yin | 711/100 |
| 2006/0080494 | A1 * | 4/2006 | Kawaguchi et al. | 711/4 |
| 2006/0115134 | A1 * | 6/2006 | Kozlay | 382/128 |
| 2006/0221719 | A1 * | 10/2006 | Maeda et al. | 365/189.05 |
| 2006/0259816 | A1 * | 11/2006 | Rector et al. | 714/14 |

FOREIGN PATENT DOCUMENTS

JP    2003-246102    9/2003

* cited by examiner

*Primary Examiner* — Thomas Lee
*Assistant Examiner* — Jaweed A Abbaszadeh
(74) *Attorney, Agent, or Firm* — Kubotera & Associates LLC.

(57) ABSTRACT

An image processing apparatus includes a data reading and writing unit for reading and writing data with respect to a specific recording medium; a data incompatibility avoiding unit for performing a data incompatibility avoiding process during reading and writing the data associated with cut-off of power; an incompatibility avoiding process starting unit for detecting a cut-off signal of power and controlling the data incompatibility avoiding unit to start the data incompatibility avoiding process; and a power cut-off delaying unit for delaying cut-off of the power for a specific period of time after the cut-off signal is detected when the data incompatibility avoiding unit starts the data incompatibility avoiding process. The data incompatibility avoiding unit performs the data incompatibility avoiding process within the specific period of time.

12 Claims, 9 Drawing Sheets

FAT number

| | 1200 | 1201 | 1202 | 1203 | 1204 | 1205 | 1206 | 1207 | 1208 |
|---|------|------|------|------|------|------|------|------|------|
| | 1201 | FFFF | 0000 | 1208 | 1207 | FFF6 | 1205 | 1305 | 1206 |

FAT data

FIG. 4

FAT number

| | 1200 | 1201 | 1202 | 1203 | 1204 | 1205 | 1206 | 1207 | 1208 |
|---|---|---|---|---|---|---|---|---|---|
| | 1201 | FFFF | 0000 | 0000 | 1207 | 0000 | 0000 | 1305 | 0000 |

FAT data

FIG. 6

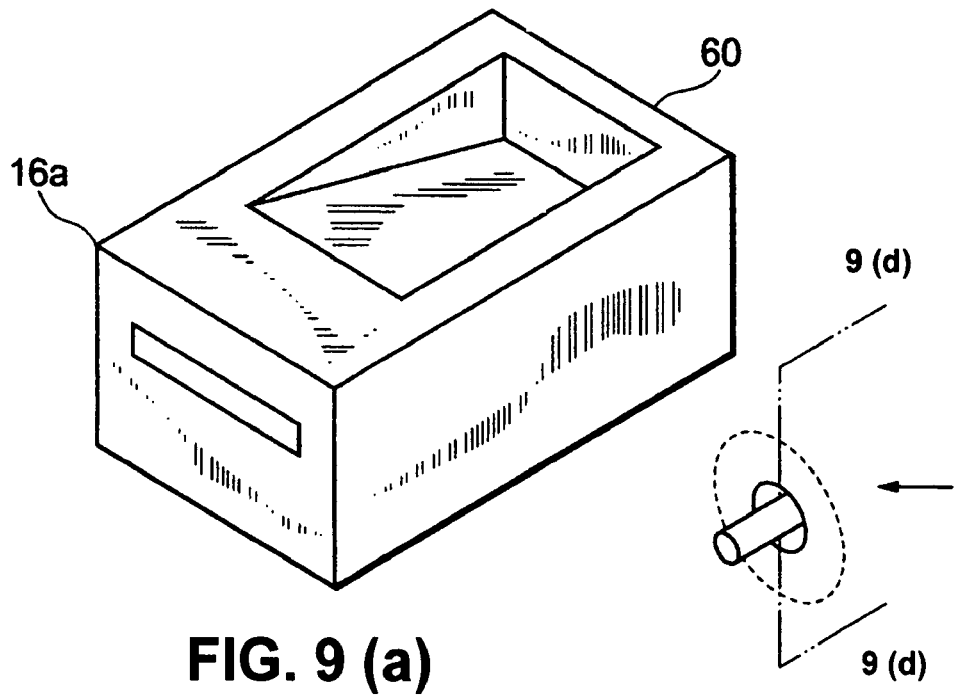
FIG. 9 (a)
FIG. 9 (c)
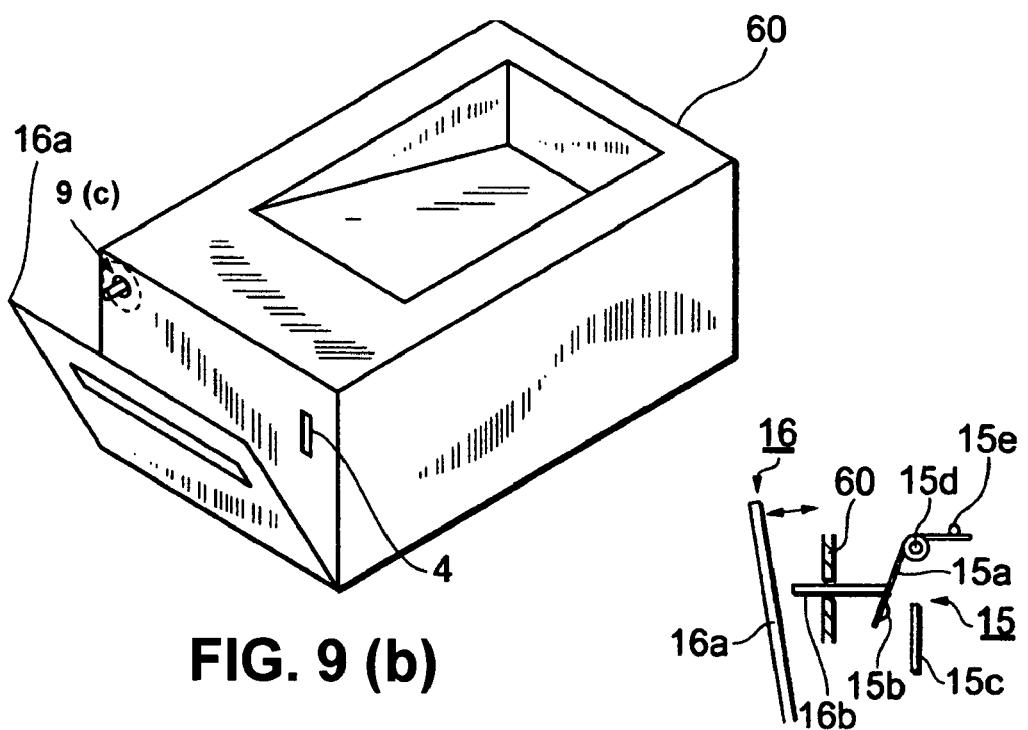
FIG. 9 (b)
FIG. 9 (d)

IMAGE PROCESSING APPARATUS

BACKGROUND OF THE INVENTION

The present invention relates to an image processing apparatus, in particular, an image processing apparatus capable of dealing with power cut-off during writing data into a hard drive.

A conventional printer is connected to a network, and receives a plurality of print jobs from a plurality of users for performing image processing. In the conventional printer, it is necessary to control a processing order of the print jobs. Especially when, during a specific print job is processed, another print job is inserted, it is necessary to suspend the specific job. For example, Patent Reference has disclosed technology for properly performing such a suspending process. However, necessity of the suspending process is not limited to the case that a print job is inserted while processing another job. For example, while writing data into a recording medium such as a hard disk, when power is cut-off due to a paper jam and the likes, and the power is turned on again, it is necessary to properly perform the suspending process.
Patent Reference: Japanese Patent Publication No. 2003-246102

In the conventional image processing apparatus, when power is cut-off due to a paper jam and the likes, and the power is turned on again, data incompatibility may occur in the hard disk.

In view of the problems described above, an object of the present invention is to provide an image processing apparatus capable of solving the problems of the conventional image processing apparatus.

Further objects and advantages of the invention will be apparent from the following description of the invention.

SUMMARY OF THE INVENTION

In order to attain the objects described above, according to the present invention, an image processing apparatus comprises a data reading and writing unit for reading and writing data with respect to a specific recording medium; a data incompatibility avoiding unit for performing a data incompatibility avoiding process during reading and writing the data associated with cut-off of power; an incompatibility avoiding process starting unit for detecting a cut-off signal of power and controlling the data incompatibility avoiding unit to start the data incompatibility avoiding process; and a power cut-off delaying unit for delaying cut-off of the power for a specific period of time after the cut-off signal is detected when the data incompatibility avoiding unit starts the data incompatibility avoiding process. The data incompatibility avoiding unit performs the data incompatibility avoiding process within the specific period of time.

In the present invention, as described above, the image processing apparatus comprises the incompatibility avoiding process starting unit for detecting the cut-off signal of power and controlling the data incompatibility avoiding unit to start the data incompatibility avoiding process; and the power cut-off delaying unit for delaying cut-off of the power for the specific period of time after the cut-off signal is detected when the data incompatibility avoiding process is started.

Accordingly, even when a user tries to cut-off the power of the image processing apparatus, the specific period of time elapses from when the data incompatibility avoiding process is started to when the power is actually cut-off. Therefore, it is possible to secure enough time for the data incompatibility avoiding unit to perform the data incompatibility avoiding process, thereby eliminating an error in the recording medium.

BRIEF DESCRIPTION OF THE DRAWINGS

FIGS. 2(a) and 2(b) are schematic views showing a power cut-off block according to the first embodiment of the present invention, wherein FIG. 2(a) shows a state that a shutter is closed and FIG. 2(a) shows a state that the shutter is opened;

FIG. 4 is a schematic view showing a file allocation table (FAT) in step S1-3 according to the first embodiment of the present invention;

FIG. 6 is a schematic view showing a file allocation table (FAT) in step S1-19 according to the first embodiment of the present invention;

FIGS. 9(a) and 9(d) are schematic views showing a power cut-off block according to the second embodiment of the present invention, wherein FIG. 9(a) shows a state that a transport path cover is closed; FIG. 9(a) shows a state that the transport path cover is opened; FIG. 9(c) is an enlarged view of a part 9(c) in FIG. 9(b); and FIG. 9(d) is a sectional view taken along a line 9(d)-9(d) in FIG. 9(c).

DETAILED DESCRIPTION OF THE PREFERRED EMBODIMENTS

Hereunder, embodiments of the present invention will be explained with reference to the accompanying drawings.

First Embodiment

Figure 1:
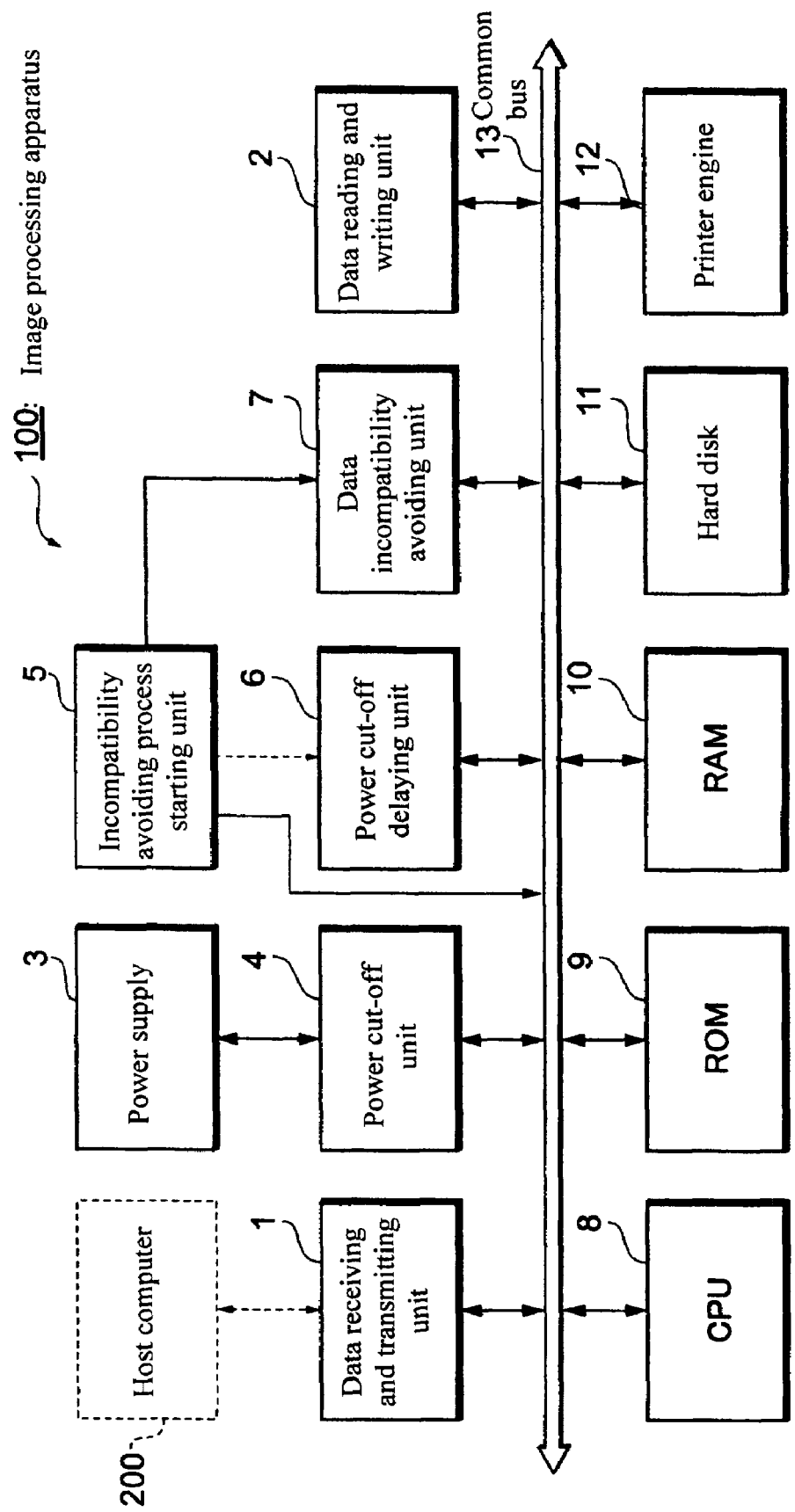
FIG. 1 is a block diagram showing a configuration of an image processing apparatus according to a first embodiment of the present invention.

A first embodiment of the present invention will be explained. FIG. 1 is a block diagram showing a configuration of an image processing apparatus 100 according to the first embodiment of the present invention. As shown in FIG. 1, the image processing apparatus 100 includes a data receiving and transmitting unit 1; a data reading and writing unit 2; a power supply 3; a power cut-off unit 4; an incompatibility avoiding process starting unit 5; a power cut-off delaying unit 6; an data incompatibility avoiding unit 7; a CPU 8; a ROM 9; a RAM 10; a hard disk 11; a printer engine 12; and a common bus 13.

In the embodiment, the data receiving and transmitting unit 1 is disposed between the image processing apparatus 100 and a host computer 200 for functioning as an interface therebetween. More specifically, print data and control data are input from the host computer 200 and sent to the image processing apparatus 100 through the data receiving and transmitting unit 1. The data reading and writing unit 2 receives the print data and control data, and also reads and writes the print data and control data with respect to the hard disk 11.

In the embodiment, the power supply 3 supplies electric power to the image processing apparatus 100 as a whole. The power cut-off unit 4 is an operation switch for cutting off power supplied to the image processing apparatus 100. The incompatibility avoiding process starting unit 5 starts a cut-off process of the power supply 3 (described later) according to a cut-off signal. The power cut-off delaying unit 6 delays the cut-off process of the power supply 3 for a specific period of time after the incompatibility avoiding process starting unit 5 starts the cut-off process of the power supply 3.

In the embodiment, the data incompatibility avoiding unit 7 performs an incompatibility avoiding process of the data written with the data reading and writing unit 2 within a specific period of time after the incompatibility avoiding process starting unit 5 starts the cut-off process of the power supply 3 (described later). The CPU 8 is a microprocessor for controlling the image processing apparatus 100 as a whole. In particular, the CPU 8 executes a program stored in the ROM 9 to start the power cut-off delaying unit 6 and the data incompatibility avoiding unit 7.

In the embodiment, the ROM 9 is a read-only memory for storing a control program to be executed by the CPU 8 for controlling the image processing apparatus 100 as a whole. The RAM 10 is a random access memory for providing calculation area when the CPU 8 executes the control program.

In the embodiment, the hard disk 11 is a non-volatile memory for storing the control program to be executed by the CPU 8 for controlling the image processing apparatus 100 as a whole, and also stores the print data and control data received from the host computer 200. The printer engine 12 receives the print data to perform a printing operation. The common bus 13 is a communication path for connecting the components described above.

Figure 2:
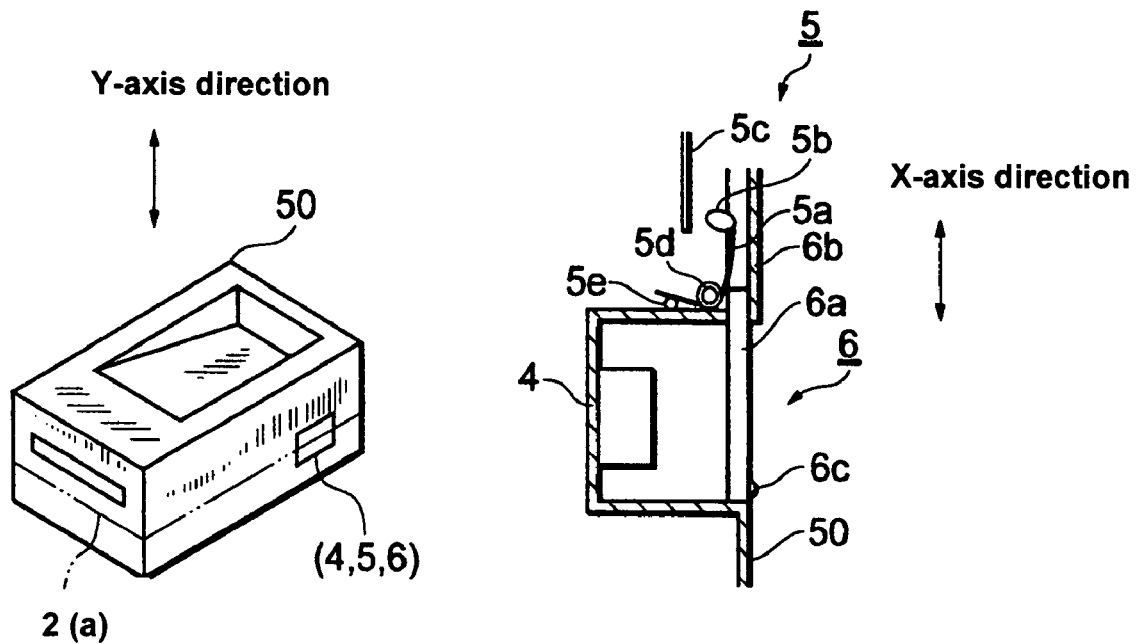
Figure 2:
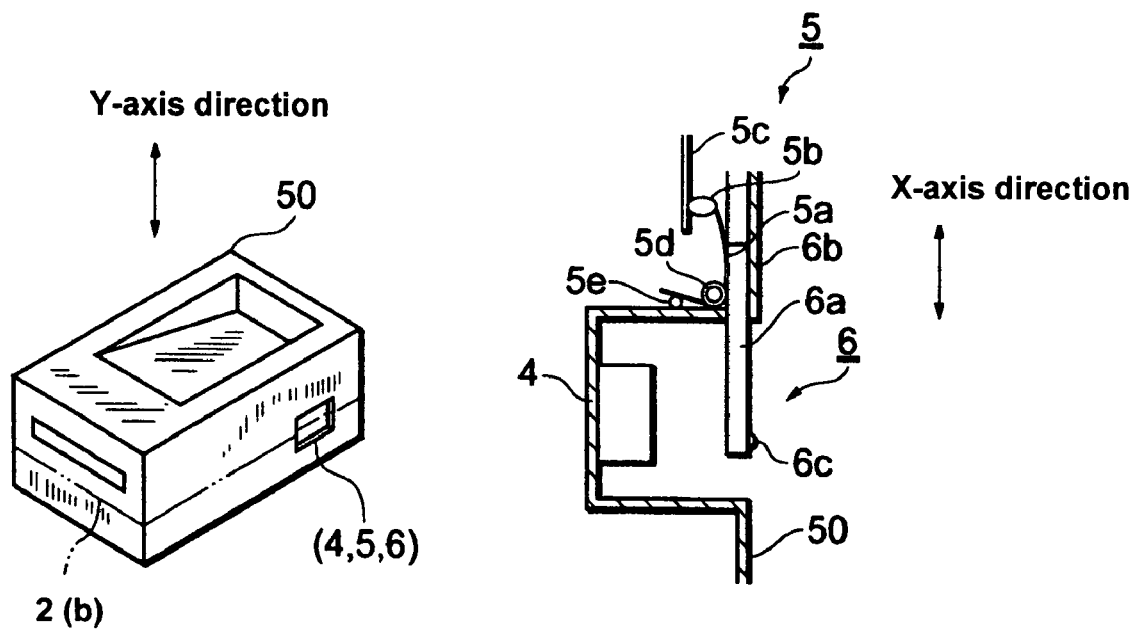

FIGS. 2(a) and 2(b) are schematic views showing a power cut-off block according to the first embodiment of the present invention. The power cut-off block is formed of the power cut-off unit 4, the incompatibility avoiding process starting unit 5, and the power cut-off delaying unit 6. FIG. 2(a) shows a state that a shutter is closed and FIG. 2(a) shows a state that the shutter is opened.

As shown in FIG. 2(a), the power cut-off unit 4, the incompatibility avoiding process starting unit 5, and the power cut-off delaying unit 6 are integrated to form the power cut-off block, and the power cut-off block is disposed in a housing 50 of the image processing apparatus 100. In FIG. 2(a), an enlarged sectional view on the right side is taken along a line 2(a). As shown in FIG. 2(a), the incompatibility avoiding process starting unit 5 includes a coil spring 5a; a conductive protrusion 5b; a protrusion receptor 5c; a post 5d; and a post 5e. Further, the power cut-off delaying unit 6 includes a shutter 6a; a rail 6b; and a handle 6c.

When an operator operates the handle 6c to slide the shutter 6a along the rail 6b in an X-axis direction so that the power cut-off unit 4 (operation switch) is operated, the coil spring 5a is pushed toward the protrusion receptor 5c so that the conductive protrusion 5c contacts with the protrusion receptor 5c as shown in FIG. 2(b). As a result, a specific current flows in the protrusion receptor 5c through a pull-up resistor (not shown), so that an incompatibility avoiding process starting signal S1 is sent to the data incompatibility avoiding unit 7 and the CPU 8.

Note that at this moment the shutter 6a is not fully opened and the operator is not able to operate the power cut-off unit 4 (operation switch). After the operator slides the shutter 6a further along the rail 6b in the X-axis direction to fully open the shutter 6a, the operator can operate the power cut-off unit 4 (operation switch). At this time, a power cut-off signal S2 is sent to the CPU 8 (FIG. 1). Accordingly, the power cut-off delaying unit 6 delays the cut-off operation of the power cut-off unit 4 for a period of time from when the incompatibility avoiding process starting signal S1 is sent to the data incompatibility avoiding unit 7 to when the power cut-off signal S2 is sent to the CPU 8 (FIG. 1).

Figure 3:
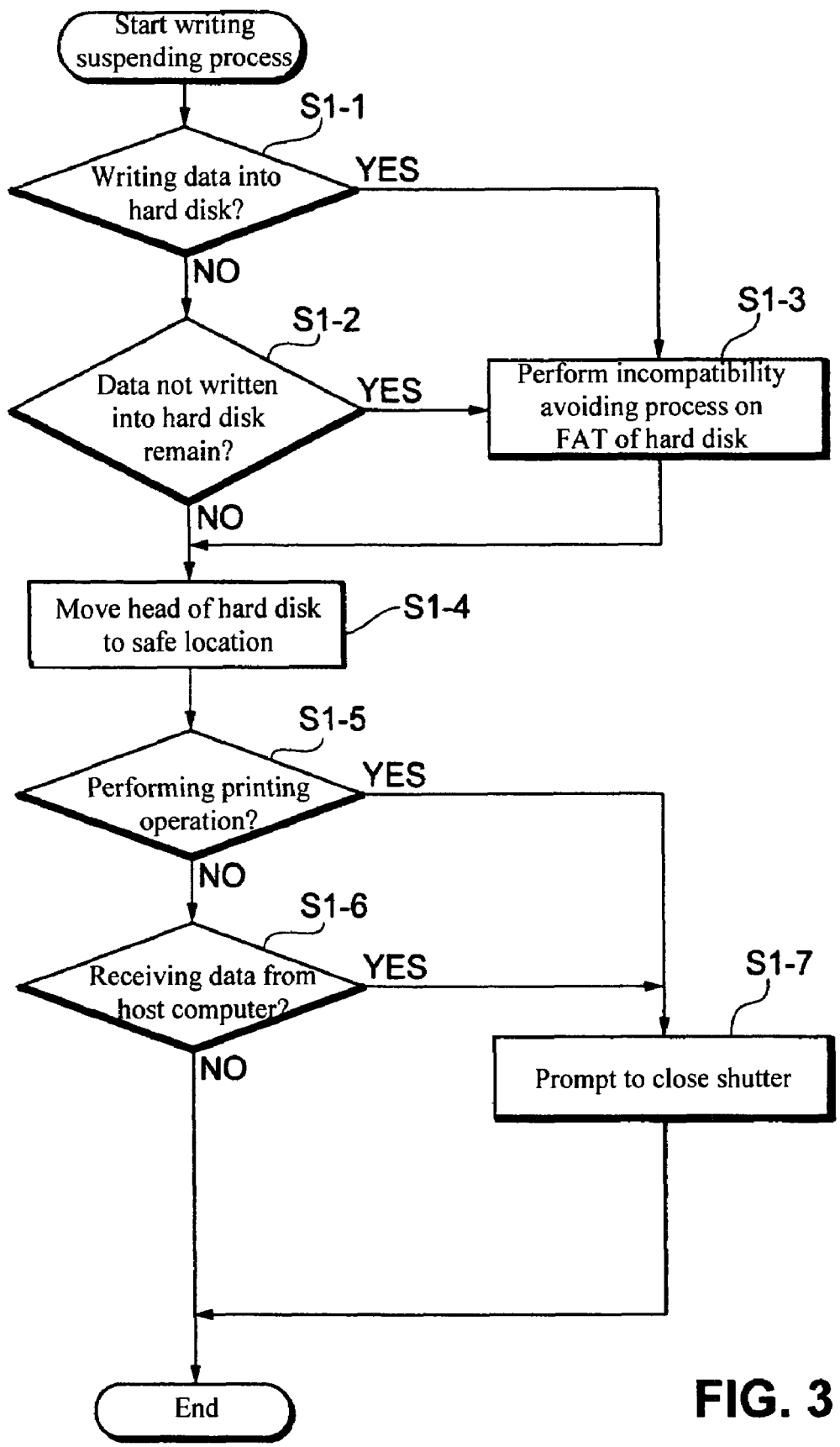
FIG. 3 is a flow chart showing a writing suspending process according to the first embodiment of the present invention.

An operation of a writing suspending process performed mainly by the data incompatibility avoiding unit 7 will be explained next. FIG. 3 is a flow chart of the writing suspending process according to the first embodiment of the present invention. In the flow chart, when the operator cuts off power of the image processing apparatus 100, the writing suspending process is automatically performed from step S1-1 to step S1-7.

In step S1-1, when the incompatibility avoiding process starting signal S1 is sent to the data incompatibility avoiding unit 7 and the CPU 8, the incompatibility avoiding process starts. The CPU 8 determines whether the data reading and writing unit 2 is writing data into the hard disk 11. When the data reading and writing unit 2 is not writing data into the hard disk 11, the process proceeds to step S1-2. When the data reading and writing unit 2 is writing data into the hard disk 11, the process proceeds to step S1-3.

In step S1-2, the CPU 8 watches the RAM 10 to determine whether data not written into the hard disk 11 remains in the RAM 10. When it is determined that data not written into the hard disk 11 remains in the RAM 10, the process proceeds to step S1-3. When it is determined that data not written into the hard disk 11 does not remain in the RAM 10, the process proceeds to step S1-4.

In step S1-3, the data incompatibility avoiding unit 7 performs the incompatibility avoiding process on a file allocation table (FAT) of the hard disk 11. The FAT is a table representing a storage location of data in the hard disk 11. When the process proceeds from step S1-1, a suspension flag is written in an FAT number indicating an area where the data reading and writing unit 2 is writing data. When the process proceeds from step S1-2, the data remaining in the RAM 10 is written in a specific area of the hard disk 11. This step will be explained in more detain later.

In step S1-4, the CPU 8 moves a writing head (the data reading and writing unit 2) for wiring data into the hard disk 11 to a safe location. In step S1-5, the CPU 8 watches the printer engine 12 to determine whether the printer engine 12 is performing the printing operation. When it is determined that the printer engine 12 is performing the printing operation, the process proceeds to step S1-7. When it is determined that the printer engine 12 is not performing the printing operation, the process proceeds to step S1-6.

In step S1-6, the CPU 8 watches the data receiving and transmitting unit 1 to determine whether the data receiving and transmitting unit 1 is receiving data. When it is determined that the data receiving and transmitting unit 1 is receiving data, the process proceeds to step S1-7. When it is determined that the data receiving and transmitting unit 1 is receiving data, the process is completed. In step S1-7, the CPU 8 prompts the operator to close the shutter 6a (FIG. 2) through a display panel (not shown), thereby completing the process.

The FAT in step S1-3 will be explained in more detail next. FIG. 4 is a schematic view showing the file allocation table (FAT) in step S1-3 according to the first embodiment of the present invention. In FIG. 4, an FAT number represents an area address of the hard disk 11 starting from 0000 in a numerical order (hexadecimal). Note that the table shown in FIG. 4 includes only a range from 1200 to 1208. Further, in FIG. 4, FAT data represents values of the FAT numbers to be accessed after the area addresses shown in the FAT number are accessed.

In the embodiment, the FAT data include several values having specific meanings. For example, 0000 represents an unused area; 0002 to FFF5 represent areas in use; FFF6 represents a suspension flag; and FFFF represents a last address of a file.

More specifically, in FIG. 4, a file A has a first address of the FAT number 1200 (upper row). The next address is 1201 shown in the FAT data (lower row) below the FAT number 1200 (upper row), thereby proceeding to the FAT number 1201 (upper row). The next address is FFFF in the FAT data (lower row) below the FAT number 1201 (upper row), thereby completing the file A at this point.

Further, in FIG. 4, since the FAT data (lower row) below the FAT number 1202 (upper row) is 0000 representing an unused area, a next file B has a first address of the FAT number 1203 (upper row). The next address is 1208 shown in the FAT data (lower row) below the FAT number 1203 (upper row), thereby proceeding to the FAT number 1208 (upper row). The FAT data (lower row) below the FAT number 1208 (upper row) is 1206, thereby proceeding to the FAT number 1206 (upper row). The FAT data (lower row) below the FAT number 1206 (upper row) is 1205, thereby proceeding to the FAT number 1205 (upper row).

When the writing suspending process is performed while the data reading and writing unit 2 (FIG. 1) is writing data in the area address 1205, the data incompatibility avoiding unit 7 (FIG. 1) writes the suspension flag FFF6 in the FAT data of the FAT number 1205 (upper row), thereby completing step S1-3.

Figure 5:
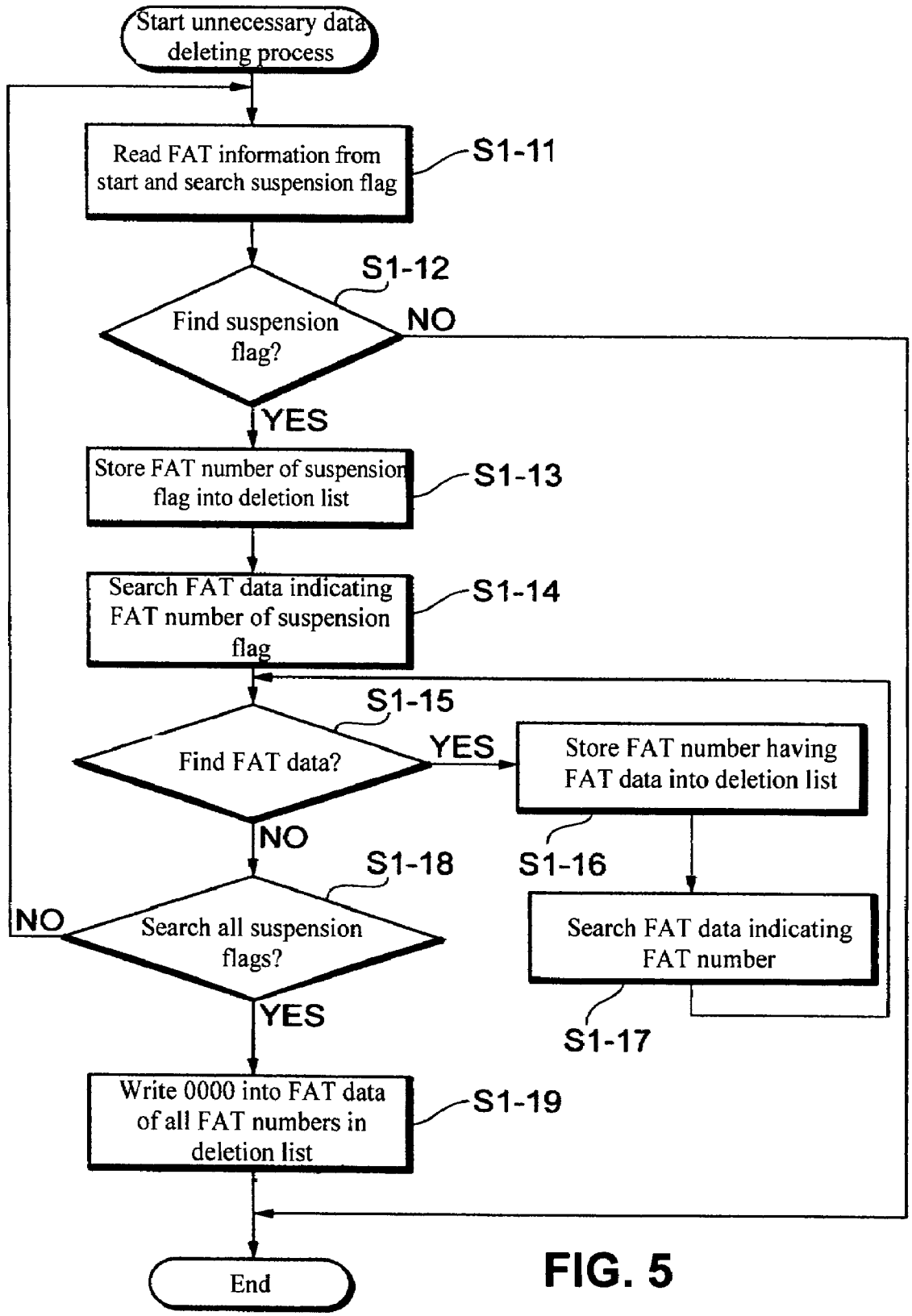
FIG. 5 is a flow chart showing an unnecessary data deleting process according to the first embodiment of the present invention.

An operation of an unnecessary data deleting process performed mainly by the data incompatibility avoiding unit 7 will be explained next. FIG. 5 is a flow chart showing the unnecessary data deleting process according to the first embodiment of the present invention. In the flow chart, when the operator turns on power of the image processing apparatus 100, the unnecessary data deleting process is automatically performed from step S1-11 to step S1-19.

In step S1-11, the incompatibility avoiding process starting signal S1 is sent to the data incompatibility avoiding unit 7 and the CPU 8, thereby starting the incompatibility avoiding process. Then, the data incompatibility avoiding unit 7 searches the suspension flag (FFF6) in the FAT of the hard disk 11 from the FAT number 0000 in the order of the FAT number through the data reading and writing unit 2. Note that numbers below 1200 are omitted in the FAT shown in FIG. 4. In step S1-12, when the suspension flag (FFF6) is found, the process proceeds to step S1-13. When the suspension flag (FFF6) is not found, the process is completed. In the embodiment, the FAT data FFF6 is found at the FAT number 1205 shown in FIG. 4.

In step S1-13, the data incompatibility avoiding unit 7 stores the FAT number thus detected in a deletion list (not shown). In the embodiment, the FAT number 1205 shown in FIG. 4 is stored. In step S1-14, the data incompatibility avoiding unit 7 searches the FAT data indicating the FAT number thus detected. In the embodiment, the FAT data of the FAT number 1205 is searched. In step S1-15, when the FAT data indicating the FAT number thus detected is found, the process proceeds to step S1-16. When the FAT data indicating the FAT number thus detected is not found, the process proceeds to step S1-18.

In step S1-16, the data incompatibility avoiding unit 7 stores the FAT number having the FAT data thus detected in the deletion list (not shown). In the embodiment, the FAT number 1206 shown in FIG. 4 is stored. In step S1-17, the data incompatibility avoiding unit 7 searches the FAT data indicating the FAT number detected in step S1-16. In the embodiment, the FAT data of the FAT number 1206 is searched.

In step S1-18, the data incompatibility avoiding unit 7 determines whether the suspension flag is searched in all of the FAT numbers. When it is determined that the suspension flag is searched in all of the FAT numbers, the process proceeds to step S1-19. When it is determined that the suspension flag is not searched in all of the FAT numbers, the process returns to step S1-11, thereby repeating the process. In step S1-19, the data incompatibility avoiding unit 7 writes 0000 into the FAT data of the FAT number to be stored in the deletion list (not shown). In the embodiment, 0000 is written into the FAT data of the FAT numbers 1205, 1206, 1208, and 1203, respectively, thereby completing the process.

FIG. 6 is a schematic view showing the file allocation table (FAT) in step S1-19 according to the first embodiment of the present invention. As shown in FIG. 6, the unnecessary data is deleted in the FAT in which the suspension flag is written in step S1-3 as shown in FIG. 4. That is, all data in the file (corresponding to the file B described above) with the suspension flag is deleted.

Figure 7:
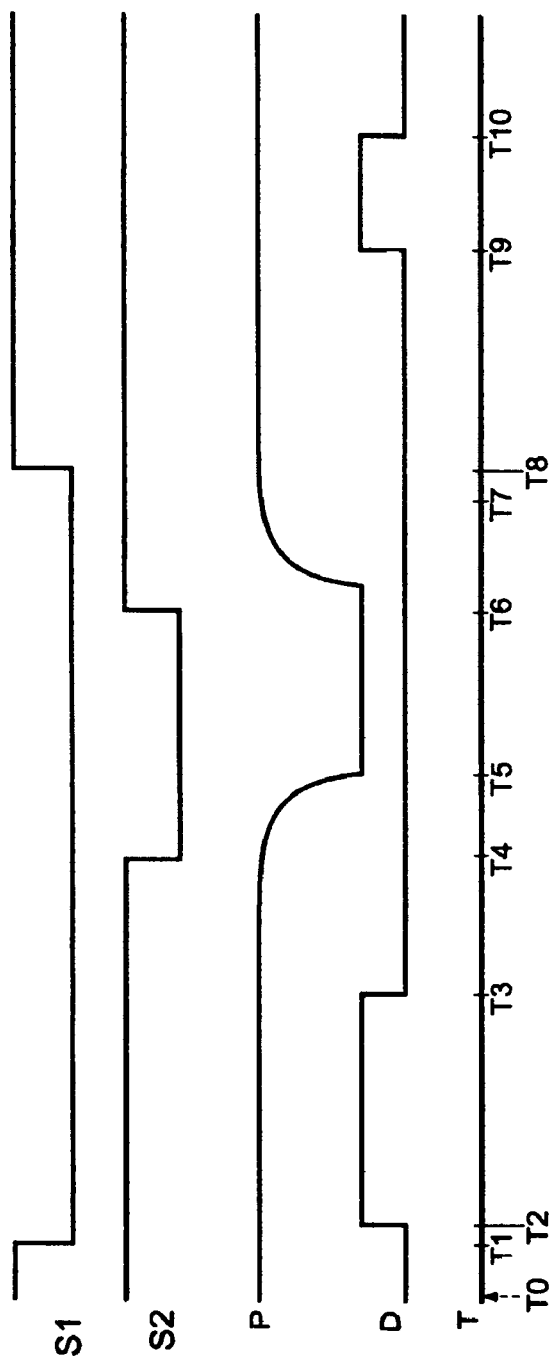
FIG. 7 is a time chart of power cut-off of the image processing apparatus according to the first embodiment of the present invention.

FIG. 7 is a time chart of power cut-off of the image processing apparatus according to the first embodiment of the present invention. In the time chart, the incompatibility avoiding process starting signal S1, the power cut-off signal S2, a power output P, and a hard disk access signal D are shown with time along a horizontal axis.

When the conductive protrusion 5b (FIG. 5) is apart from the protrusion receptor 5c (open state), the incompatibility avoiding process starting signal S1 is at a high (H) level, and when the conductive protrusion 5b (FIG. 5) contacts with the protrusion receptor 5c (contact state), the incompatibility avoiding process starting signal S1 is at a low (L) level. When the switch is turned on, the power cut-off signal S2 is at a high (H) level, and when the switch is turned off, the power cut-off signal S2 is at a low (H) level. When power is on, the power output P is at a high (H) level, and when power is off, the power output P is at a low (L) level.

The time chart will be explained in more detail when the image processing apparatus temporarily becomes the power shut-off state from a normal state and then returns to the normal state again.

At time T0, the image processing apparatus is in the normal state. In the normal state, the shutter 6a (FIG. 2) is closed, and the conductive protrusion 5b (FIG. 5) is apart from the protrusion receptor 5c (open state). Accordingly, the incompatibility avoiding process starting signal S1 is at the H level. Since the power cut-off unit 4 (operation switch) is turned on, the power cut-off signal S2 is at the H level. Further, the power output P is at the H level (sully state). Since the data incompatibility avoiding unit 7 (FIG. 1) does not start yet, the hard disk access signal D is at a low (L) level.

At time T1, when the operator moves the shutter 6a (FIG. 2) to turn off the power cut-off unit 4 (operation switch), the conductive protrusion 5b (FIG. 5) contacts with the protrusion receptor 5c (contact state). Accordingly, the incompatibility avoiding process starting signal S1 becomes the L level. At this time, the incompatibility avoiding process starting unit 5 (FIG. 1) detects the power cut-off. Accordingly, the change of the incompatibility avoiding process starting signal S1 is sent to the CPU 8 (FIG. 1) and the data incompatibility avoiding unit 7 (FIG. 1), so that the data incompatibility avoiding unit 7 is ready to start the data incompatibility avoiding process.

At time T2, the CPU 8 (FIG. 1) changes the hard disk access signal D to a high (H) level to perform the writing suspending process for a specific period of time. At the same time, the data incompatibility avoiding unit 7 (FIG. 1) starts the data incompatibility avoiding process.

At time T3, the CPU 8 (FIG. 1) changes the hard disk access signal D to the low (L) level to move the data reading and writing unit 2 (FIG. 1) or the head to the safe location. By this time, the data incompatibility avoiding unit 7 (FIG. 1) completes the data incompatibility avoiding process.

At time T4, since the operator opens the shutter 6a (FIG. 2) to turn off the power cut-off unit 4 (operation switch), the power cut-off signal S2 becomes the low (L) level. At this time, the power cut-off delaying unit 6 (FIG. 1) functions for the period of time from when the operator moves the shutter 6a (FIG. 2) at time T1 to when the power cut-off unit 4 (operation switch) is turned off at time T4.

At time T5, after the operator turns off the power cut-off unit 4 (operation switch), the power output D becomes the power shut-off state with a slight delay according to a time constant of a circuit inside the apparatus.

At time T6, the operator turns on the power cut-off unit 4 (operation switch). At this time, the shutter 6a is in the open state. At time T7, after the operator turns on the power cut-off unit 4 (operation switch), the power output D becomes the power supply state with a slight delay according to a time constant of a circuit inside the apparatus.

At time T8, when the operator closes the shutter 6a (FIG. 2), the conductive protrusion 5b (FIG. 5) is apart from the protrusion receptor 5c (open state). At this time, since the power is already turned on, the incompatibility avoiding process starting signal S1 becomes the H level. The change of the incompatibility avoiding process starting signal S1 is sent to the CPU 8 (FIG. 1) and the data incompatibility avoiding unit 7 (FIG. 1), so that the data incompatibility avoiding unit 7 can start the unnecessary data deleting process.

At time T9, the CPU 8 (FIG. 1) changes the hard disk access signal D to the high (H) level to perform the writing preparation process for a specific period of time. At the same time, the data incompatibility avoiding unit 7 (FIG. 1) starts the unnecessary data deleting process. At time T10, the image processing apparatus returns to the normal state.

As described above, in the first embodiment, the shutter mechanism is provided for protecting the power operation switch. Accordingly, it is possible to secure the time for performing the data incompatibility avoiding process from when the operator opens the shutter and to when the operator turns off the power operation switch. Further, after the operator turns on the operation switch again, when the operator closes the shutter, the unnecessary data deleting process is automatically performed. Accordingly, even when the power supply is turned on and off, it is possible to prevent an error in the hard disk.

Second Embodiment

In the first embodiment, the shutter mechanism is provided for protecting the power operation switch. Accordingly, it is possible to secure the time for performing the data incompatibility avoiding process from when the operator opens the shutter and to when the operator turns off the power operation switch. In the second embodiment, when an expected event such as a paper jam occurs during an operation of an image processing device, it is configured that the data incompatibility avoiding process is performed during dealing with the event.

Components in the second embodiment similar to those in the first embodiment are designated by the same reference numerals, and explanations thereof are omitted.

Figure 8:
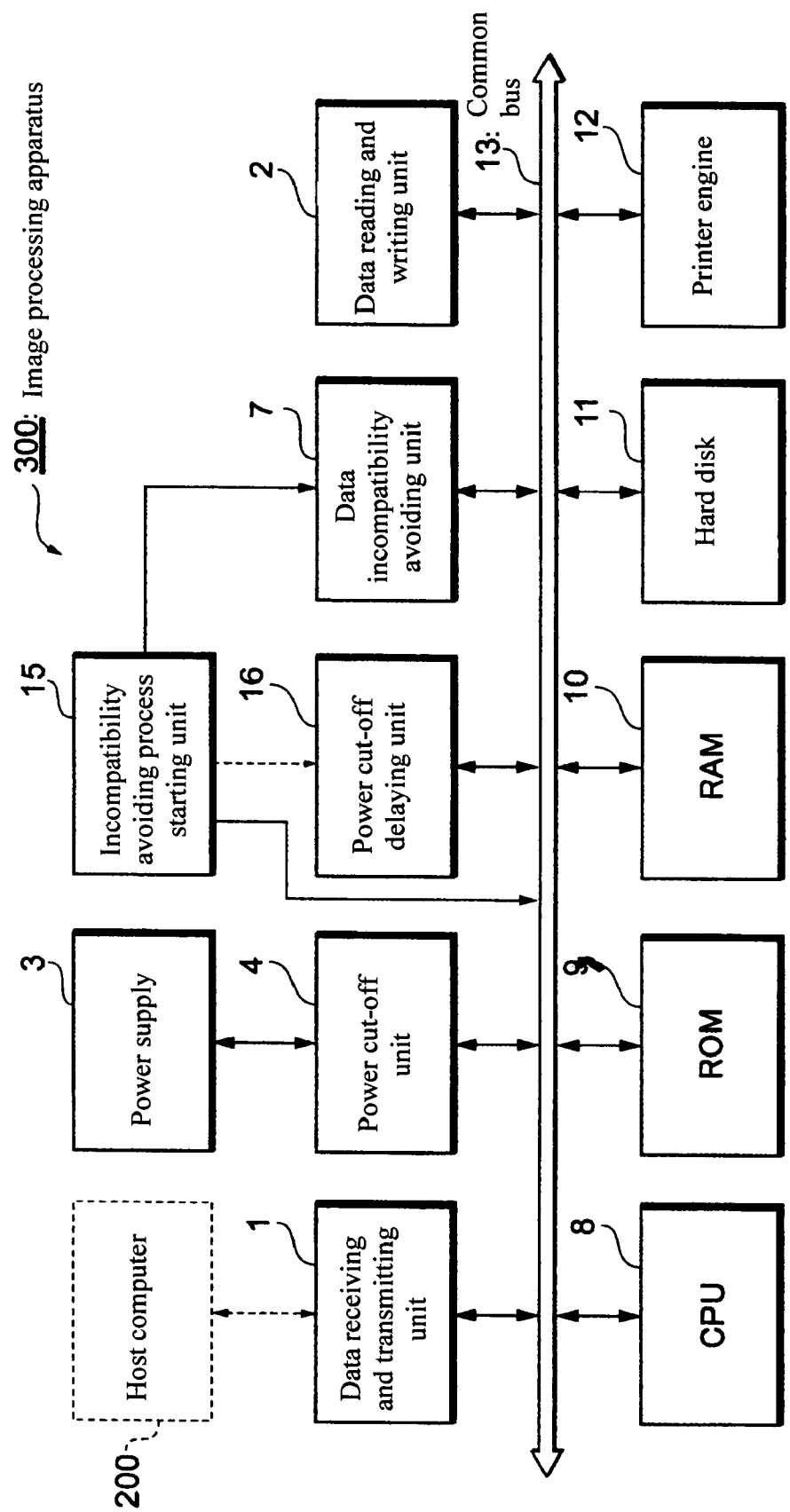
FIG. 8 is a block diagram showing a configuration of an image processing apparatus according to a second embodiment of the present invention.

FIG. 8 is a block diagram showing a configuration of the image processing apparatus 300 according to the second embodiment of the present invention. As shown in FIG. 8, the image processing apparatus 300 includes the data receiving and transmitting unit 1; the data reading and writing unit 2; the power supply 3; the power cut-off unit 4; an incompatibility avoiding process starting unit 15; a power cut-off delaying unit 16; the data incompatibility avoiding unit 7; the CPU 8; the ROM 9; the RAM 10; the hard disk 11; the printer engine 12; and the common bus 13.

In the first embodiment, the shutter mechanism is provided for protecting the power operation switch (the power cut-off unit 4 shown in FIG. 1), and the incompatibility avoiding process starting unit 5 and the power cut-off delaying unit 6 are disposed in the shutter mechanism. In the second embodiment, an operation switch (the power cut-off unit 4 shown in FIG. 8) is disposed in a sheet transport path capable of opening and closing, and the incompatibility avoiding process starting unit 15 and the power cut-off delaying unit 16 are disposed in the operation switch.

A power cut-off block will be explained next. The power cut-off block is formed of the power cut-off unit 4, the incompatibility avoiding process starting unit 15, and the power cut-off delaying unit 16.

FIGS. 9(a) and 9(d) are schematic views showing the power cut-off block according to the second embodiment of the present invention. FIG. 9(a) shows a state that a transport path cover is closed; FIG. 9(a) shows a state that the transport path cover is opened; FIG. 9(c) is an enlarged view of a part 9(c) in FIG. 9(b); and FIG. 9(d) is a sectional view taken along a line 9(d)-9(d) in FIG. 9(c).

As shown in FIG. 9(a), a housing 60 is provided with a front cover 16a for covering the power cut-off block. As shown in FIG. 9(b), when the front cover 16a opens, the power cut-off block is exposed. As shown in FIG. 9(b), the incompatibility avoiding process starting unit 15 and the power cut-off delaying unit 16 are disposed at the part 9(c), and the power cut-off unit 4 (power operation switch) is disposed at a side opposite to the part 9(c).

As shown in FIG. 9(d), the incompatibility avoiding process starting unit 15 includes a coil spring 15a; a conductive protrusion 15b; a protrusion receptor 15c; a post 15d; and a post 15e. Further, the power cut-off delaying unit 16 includes the front cover 16a and a plunger 16b.

When an operator opens the front cover 16a to operate the power cut-off unit 4 (operation switch), the plunger 16b pushes the conductive protrusion 15b, so that the conductive protrusion 15c is apart from the protrusion receptor 15c. As a result, a specific current flowing in the protrusion receptor 15c through a pull-up resistor (not shown) is cut-off, so that the incompatibility avoiding process starting signal S1 is sent to the data incompatibility avoiding unit 7 and the CPU 8.

Note that at this moment the front cover 16a is not fully opened and the operator is not able to operate the power cut-off unit 4 (operation switch). After the operator fully opens the front cover 16a, the operator operates the power cut-off unit 4 (operation switch). At this time, the power cut-off signal S2 is sent to the CPU 8 (FIG. 8). Accordingly, the power cut-off delaying unit 16 delays the cut-off operation of the power cut-off unit 4 for a period of time from when the incompatibility avoiding process starting signal S1 is sent to the data incompatibility avoiding unit 7 to when the power cut-off signal S2 is sent to the CPU 8 (FIG. 8). A process after this moment is the same as that in the first embodiment, and explanation thereof is omitted.

As described above, in the second embodiment, the operation switch (the power cut-off unit 4 shown in FIG. 8) is disposed in the sheet transport path capable of opening and closing, and the incompatibility avoiding process starting unit 15 and the power cut-off delaying unit 16 are disposed in the operation switch. Accordingly, in addition to the effect in the first embodiment, when an expected event such as a paper jam occurs during the operation of the image processing device, the data incompatibility avoiding process is performed during dealing with the event.

In the embodiments described above, the present invention is applied to the printer, and is not limited thereto. For example, the present invention is applicable to a facsimile device or a copier, in which data is written into a recoding medium such as a hard disk or a memory card.

The disclosure of Japanese Patent Application No. 2006-066571, filed on Mar. 10, 2006, is incorporated in the application.

While the invention has been explained with reference to the specific embodiments of the invention, the explanation is illustrative and the invention is limited only by the appended claims.

What is claimed is:

1. An image processing apparatus, comprising:
a data reading and writing unit for reading and writing data with respect to a recording medium;
a data incompatibility avoiding unit for performing a data incompatibility avoiding process during reading and writing the data;
an incompatibility avoiding process starting unit for detecting a cut-off signal of power and controlling the data incompatibility avoiding unit to start the data incompatibility avoiding process; and
a power cut-off delaying unit for delaying cut-off of the power for a specific period of time after the cut-off signal is detected when the data incompatibility avoiding unit starts the data incompatibility avoiding process so that the data incompatibility avoiding unit performs the data incompatibility avoiding process within the specific period of time, said power cut-off delaying unit including a cut-off switch for cutting off the power and a cover for covering the cut-off switch so that the cut-off switch can be operated to cut off the power when the cover is opened,
wherein said incompatibility avoiding process starting unit includes a sensor for detecting when the cover moves so that the data incompatibility avoiding unit starts the data incompatibility avoiding process when the sensor detects that the cover moves.

2. The image processing apparatus according to claim 1, further comprising a suspension flag writing unit for writing a suspension flag into the recording medium.

3. The image processing apparatus according to claim 1, wherein said cut-off switch is disposed in a transport path having a front cover as the cover.

4. The image processing apparatus according to claim 3, wherein said incompatibility avoiding process starting unit includes a sensor for detecting when the front cover opens so that the data incompatibility avoiding unit starts the data incompatibility avoiding process when the sensor detects that the front cover opens.

5. The image processing apparatus according to claim 1, wherein said data incompatibility avoiding unit is arranged to perform the data incompatibility avoiding process during a period of time from when the cover starts moving to when the cut-off switch is pushed.

6. The image processing apparatus according to claim 1, wherein said cover is arranged so that the cut-off switch can be pushed when the cover fully opened.

7. The image processing apparatus according to claim 1, further comprising a central process unit (CPU) for prompting an operator to close the cover when the cover is opened while receiving the data or printing.

8. An image processing apparatus for processing an image according to data, comprising:
a data writing unit for writing the data to a recording medium;
a data writing detection unit for detecting that the data writing unit is writing the data;
a power control unit for controlling power, said power control unit including a power switch;
a protection unit for protecting the power control unit, said protection unit including a cover for covering the power switch;
a protection release detection unit for detecting that the protection unit stops protecting the power control unit, said protection release detection unit including a sensor for detecting whether the cover is opened; and
a suspension processing unit for suspending the data writing unit when the protection release detection unit detects the protection unit stops protecting the power control unit.

9. The image processing apparatus according to claim 8, wherein said suspension processing unit includes a suspension flag writing unit for writing a suspension flag indicating a suspension location of the data, and a data deletion unit for searching the suspension flag and deleting the data corresponding to the suspension flag when it is detected that the power control unit turns on the power after the power control unit turns off the power.

10. The image processing apparatus according to claim 8, wherein said suspension processing unit is arranged to suspend the data writing unit during a period of time from when the cover starts moving to when the power switch is pushed.

11. The image processing apparatus according to claim 8, wherein said cover is arranged so that the power switch can be pushed when the cover fully opened.

12. The image processing apparatus according to claim 8, further comprising a central process unit (CPU) for prompting an operator to close the cover when the cover is opened while receiving the data or printing.

* * * * *